United States Patent [19]

Burrows

[11] Patent Number: 4,834,873

[45] Date of Patent: May 30, 1989

[54] COMBINED REVERSE OSMOSIS UNIT AND WATER INFLOW CONTROL VALVE FOR A WATER PURIFICATION SYSTEM

[76] Inventor: Bruce D. Burrows, 25581 Via Paladar, Valencia, Calif. 91355

[21] Appl. No.: 233,163

[22] Filed: Aug. 17, 1988

[51] Int. Cl.⁴ ............................................. B01D 13/00
[52] U.S. Cl. ..................................... 210/136; 210/131; 210/257.2; 210/321.65; 210/321.67; 210/354; 210/431
[58] Field of Search .................... 210/97, 98, 131, 136, 210/232, 257.2, 321.65, 418, 429, 431, 235, 352, 354, 321.67

[56] References Cited

U.S. PATENT DOCUMENTS

| | | | |
|---|---|---|---|
| 1,506,967 | 9/1924 | Bosworth | 210/131 |
| 1,805,450 | 5/1931 | Harvey | 210/131 |
| 2,134,413 | 10/1938 | Munoz | 210/136 |
| 3,568,843 | 3/1971 | Brown | 210/321.65 |
| 4,070,280 | 1/1978 | Brag | 210/321.67 |
| 4,190,537 | 2/1980 | Tondreau et al. | 210/321.65 |
| 4,585,554 | 4/1986 | Burrows | 210/110 |
| 4,595,497 | 6/1986 | Burrows | 210/110 |
| 4,734,262 | 3/1988 | Bagshawe | 210/431 |
| 4,743,366 | 5/1988 | Burrows | 210/110 |

OTHER PUBLICATIONS

Herron and Maynard: Self Regulating Filter and Valve Assembly-IBM Technical Disclosure Bulletin, vol. 16, No. 11, 4/74.

*Primary Examiner*—Peter Hruskoci
*Assistant Examiner*—Christopher Upton
*Attorney, Agent, or Firm*—Kelly, Bauersfeld & Lowry

[57] ABSTRACT

An improved reverse osmosis unit is provided for use in a water purification system, wherein the reverse osmosis unit includes an integral control valve for regulating water inflow in response to system demand for purified water. The reverse osmosis unit includes a feed water inlet receiving a supply of ordinary tap water or the like for flow through a reverse osmosis cartridge having a membrane for separating the water inflow into a relatively pure water supply and a reject water supply with impurities concentrated therein. The pure water supply is coupled through a pure outlet port for collection within an appropriate storage vessel to await dispensing through a faucet valve or the like, whereas the reject water supply flows through a reject outlet port for discharge to a drain. When the storage vessel reaches a predetermined or substantially filled condition, the fluid pressure within the storage vessel acts against a control piston to displace the reverse osmosis cartridge and an integrated inflow control valve carried thereby toward a position closing or throttling the incoming feed water flow.

36 Claims, 5 Drawing Sheets

COMBINED REVERSE OSMOSIS UNIT AND WATER INFLOW CONTROL VALVE FOR A WATER PURIFICATION SYSTEM

BACKGROUND OF THE INVENTION

This invention relates generally to improvements in water purification systems of the type adapted to provide a supply of purified water for drinking, cooking, etc. More particularly, this invention relates to an improved reverse osmosis unit for use in water purification systems, wherein the reverse osmosis unit includes a control valve for regulating water inflow to the system.

Water purification systems in general are relatively well-known in the art for use in producing a supply of purified water from ordinary tap water or the like. Such water purification systems commonly include a reverse osmosis unit having an inlet connected to a feed or tap water supply. The feed water supply flows through a reverse osmosis membrane which separates the inflow into two water outflows, namely, a relatively pure water supply and a relatively impure waste or reject water supply having impurities concentrated therein. The produced purified water is normally coupled for flow into a suitable storage vessel awaiting dispensing, for example, through a faucet valve or the like, whereas the reject or waste water flow is normally discharged to an appropriate drain for disposal. Within the storage vessel, the produced pure water is normally maintained within a chamber defined in part by a resilient bladder or diaphragm. Some systems utilize a charge of compressed air or the like acting against the bladder to expel the pure water through an open faucet valve, as depicted, for example, in U.S. Pat. No. 3,568,843. Other systems rely upon the reject water flow to provide a driving force acting upon the bladder to expel pure water when a faucet valve is opened. See, for example, U.S. Pat. Nos. 4,585,554; 4,595,497; and 4,743,366. In either system type, the reverse osmosis membrane is commonly provided in the form of a disposable cartridge adapted for easy replacement on a periodic basis due to particulate and/or residue accumulation, typically at intervals of about one to three years in a residential water supply environment.

In such reverse osmosis water purification systems, the production of purified water is relatively slow in comparison with typical tap water flow rates through a faucet valve. More specifically, for proper operation of the reverse osmosis membrane, a fluid backpressure must be maintained by appropriate restriction of a reject water outlet to insure migration of a portion of the feed water inflow through the membrane for purification purposes. This operation unfortunately results in slow pure water production at normal water supply pressures, whereby the storage vessel is essential to collect and store a quantity of pure water sufficient to meet normal demand surges. However, when the storage vessel reaches a substantially filled condition, further production of purified water by the reverse osmosis unit is diverted through a relief means to a drain resulting in substantial water waste. Such water waste undesirably increases the overall operating cost of a water purification system, and can be especially undesirable in geographical regions having limited water supplies.

A variety of valve mechanisms have been proposed in the prior art for throttling or halting feed water inflow to a water purification system whenever a pure water storage vessel or reservoir reaches a substantially filled condition. Such valve mechanisms, however, have generally comprised relatively complicated structures provided as separate system components and including a variety of movable valve structures and related seal members, etc. While some of these valve mechanisms have satisfactorily reduced water waste in water purification systems, the complex structure and operation of such devices have undesirably increased system costs and provided mechanical components subject to periodic failure and replacement. Accordingly, to insure proper system operation, it has been necessary to service such valve mechanisms on a periodic basis for maintenance or repair purposes.

There exists, therefore, a significant need for further improvements in water purification systems, particularly with respect to simplification of water inflow control valves designed to throttle or halt feed water inflow when a purified water reservoir reaches a filled condition. Moreover, there exists a need for such inflow control valves designed to operate substantially without risk of valve component failure. The present invention fulfills these needs and provides further related advantages.

SUMMARY OF THE INVENTION

In accordance with the invention, a reverse osmosis unit is provided for use in a water purification system, wherein the reverse osmosis unit includes an integrated water inflow control valve. The improved reverse osmosis unit includes a reverse osmosis cartridge having an appropriate membrane for use in producing a supply of relatively pure water from a feed water supply, such as ordinary tap water or the like. The reverse osmosis cartridge incorporates a water inflow control valve to regulate feed water inflow to the system. In the preferred form, the reverse osmosis cartridge and the inflow control valve move as a single unit between positions respectively permitting and preventing or throttling feed water inflow to the system.

The water purification system generally comprises the reverse osmosis unit for separating the feed water supply into a supply of relatively pure water and a supply of reject or waste water having impurities or contaminants concentrated therein. The pure water supply is coupled to and accumulated within an appropriate chamber in a storage vessel ready for dispensing, wherein the reject water supply is disposed or discarded to a suitable drain. The system includes means for applying sufficient pressure to the stored pure water, such that the pure water is delivered or dispensed from the storage vessel through a faucet valve or the like whenever the faucet valve is opened.

The reverse osmosis unit comprises an elongated unit housing having a size and shape to receive the reverse osmosis cartridge in the form of an elongated membrane wrapped tightly about a perforated support tube. At one end of the housing, the feed water supply is connected for inflow to the housing through an inflow port for substantially longitudinal passage through the cartridge. A first portion of this feed water supply flows through the cartridge to a reject outlet port at or near an opposite end of the housing for flow further to the drain. By imposing a fluid backpressure at the reject outlet port, a second portion of the water is caused to migrate through the membrane and into the perforated support tube for flow from the housing through a pure outlet port. This produced pure water supply is coupled to and stored within the storage vessel.

A control piston is mounted at one end of the reverse osmosis cartridge in a position exposed to the pure water pressure at the pure water outlet port. This pure water pressure applies a force to the control piston in a direction for displacing the entire cartridge and the inflow control valve toward a position with the inflow control valve seating upon and closing the inflow port during certain operating conditions, thereby halting or throttling feed water inflow to the reverse osmosis unit.

More particularly, as the storage vessel fills with produced purified water, the stored water is subjected to an increasing fluid pressure which acts upon the control piston. This pure water pressure may be supplemented by a biasing spring. When the storage vessel reaches a substantially filled condition, as represented by a predetermined maximum pure water pressure relative to the feed water pressure, the pressure force overcomes the counteracting pressure of the feed water to shift the cartridge toward a position closing or throttling the inflow port. Further feed water inflow to the system is prevented or throttled until a portion of the stored purified water is dispensed through the faucet valve, thereby reducing the pure water pressure applied to the control piston sufficiently to permit the pressure of incoming feed water to reopen the inflow port. When the inflow control valve is closed, in one preferred form, a check valve within the perforated support tube conveniently isolates the membrane from fluid pressure within the storage vessel. In another preferred embodiment, a seal member movable with the cartridge closes the reject water outlet port as the inflow control valve moves to the closed position.

The reverse osmosis cartridge and the integrated inflow control valve and/or control piston are advantageously replaced as a single unit each time the reverse osmosis cartridge is replaced, typically at about one to three year intervals. Such replacement essentially provides a new or rebuilt inflow control and/or related control piston as a normal by-product of periodic cartridge replacement.

Other features and advantages of the present invention will become more apparent with the following detailed description, taken in conjunction with the accompanying drawings which illustrate, by way of example, the principles of the invention.

BRIEF DESCRIPTIONS OF THE DRAWINGS

The accompanying drawings illustrate the invention. In such drawings.

DETAILED DESCRIPTION OF THE PREFERRED EMBODIMENTS

Figure 1:
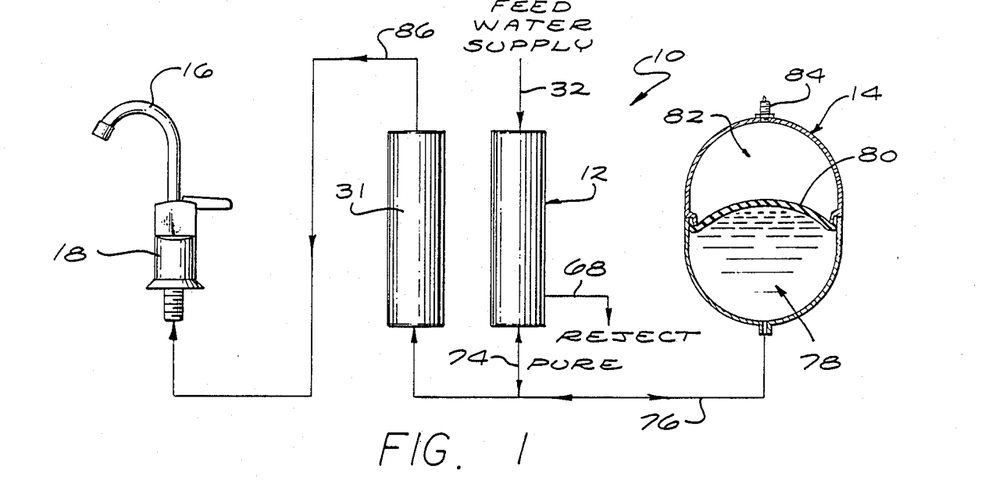
FIG. 1 is a schematic diagram generally depicting a water purification system of the type including a reverse osmosis unit.

As shown in the exemplary drawings, a water purification system referred to generally in FIG. 1 by the reference numeral 10 includes a reverse osmosis unit 12 for producing relatively purified water from a supply of feed water such as ordinary tap water or the like. The produced pure water supply is stored within a storage vessel 14 ready for dispensing through the discharge spout 16 of a faucet valve 18 or the like. In accordance with the invention, the reverse osmosis unit 12 is integrated or combined with a feed water inflow control valve 20 and a related control piston 21 (FIG. 2) for halting or throttling feed water inflow to the system 10 when the storage vessel 14 reaches a substantially filled condition.

The improved reverse osmosis unit 12 of the present invention advantageously integrates a disposable reverse osmosis cartridge 22 with the feed water inflow control valve 20 and related control piston 21 into a relatively economical unit. The cartridge 22 is designed for separating the feed water inflow into relatively pure and relatively impure or reject water supplies, in a manner known to those skilled in the art of reverse osmosis water purification systems. Produced pure water is coupled to and stored within the storage vessel 14 where it is ready for dispensing on demand. However, in accordance with the invention, the cartridge 22 responds, by means of the inflow control valve 20 and control piston 21, to the storage vessel reaching a predetermined or substantially filled condition to halt or throttle feed water inflow. In this way, water waste which would otherwise occur is avoided. Moreover, failure and/or periodic servicing of the valve components are substantially eliminated, since the control valve 20 and/or control piston 21 are replaced or rebuilt as a normal incident to periodic replacement of the reverse osmosis cartridge, typically at intervals of about one to three years in a normal domestic or household water supply system.

Figure 2:
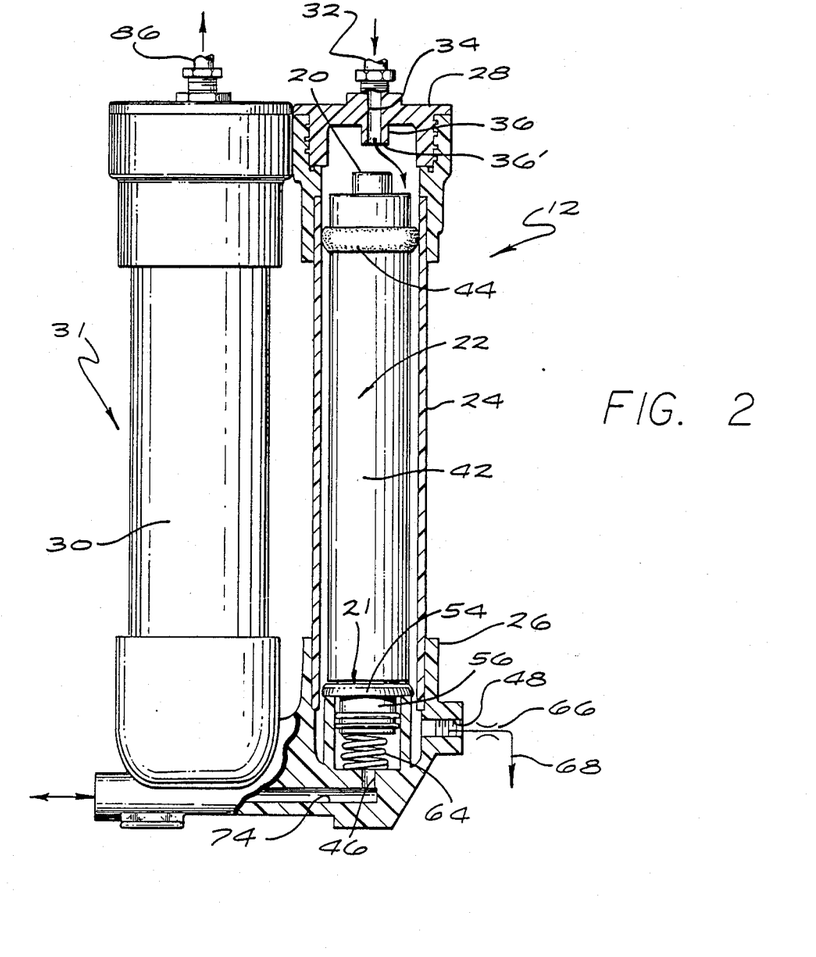
FIG. 2 is an enlarged front elevation view of a reverse osmosis unit embodying the novel features of the invention, with portions shown in vertical section to illustrate an integrated inflow control valve in an open position.
Figure 3:
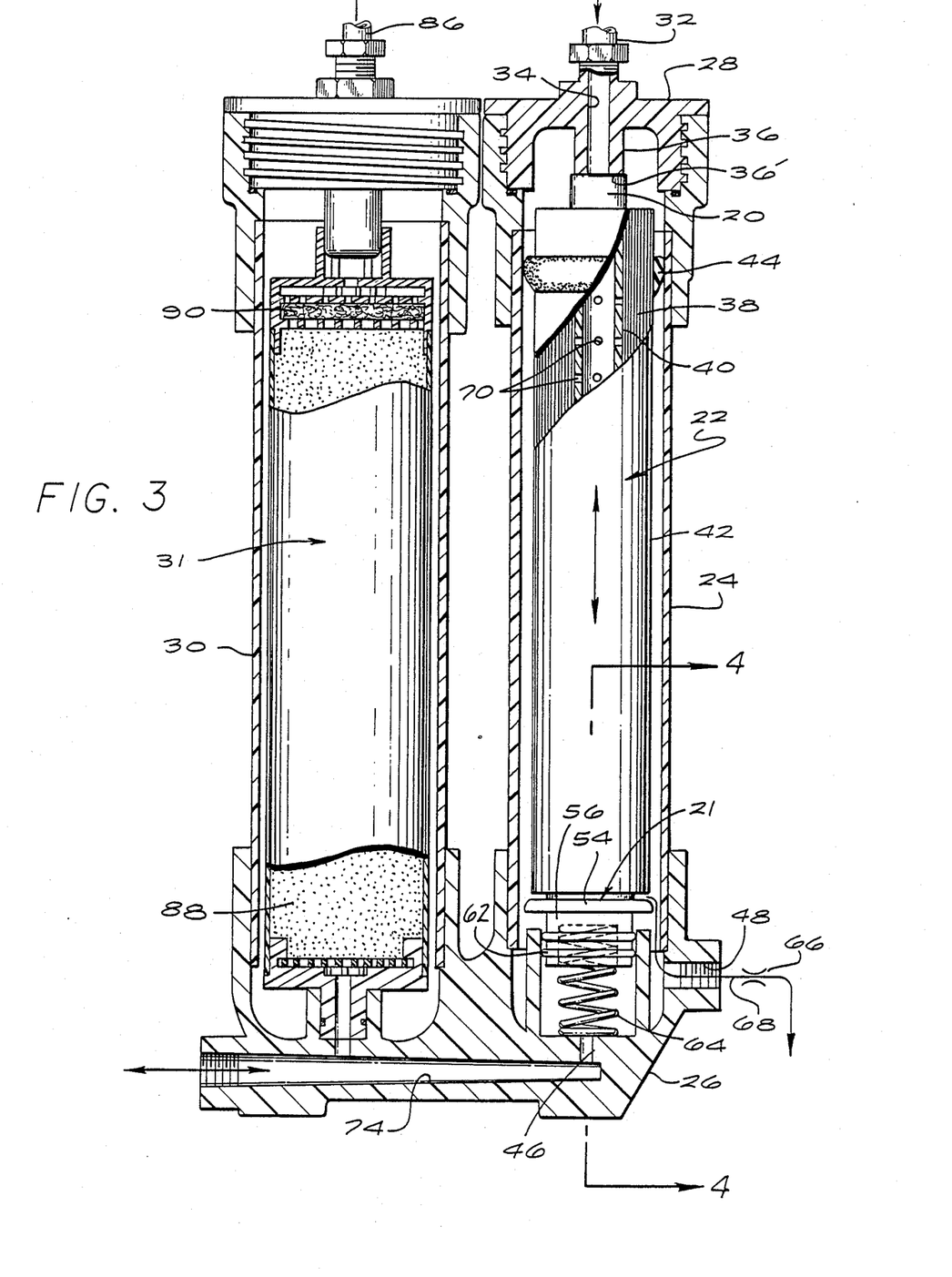
FIG. 3 is a further enlarged vertical sectional view of the reverse osmosis unit, with portions shown in front elevation, and depicting the inflow control valve in a closed position.
Figure 4:
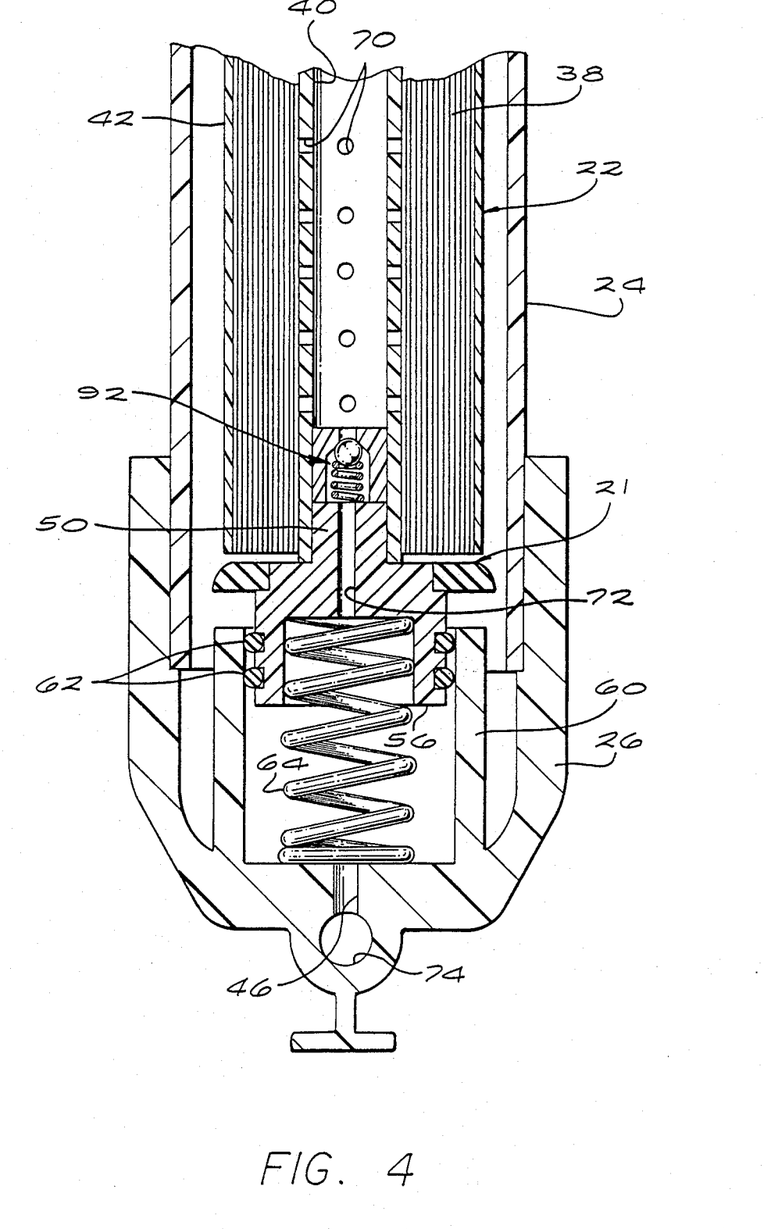
FIG. 4 is an enlarged fragmented vertical sectional view taken generally on the line 4—4 of FIG. 3.

As shown in more detail in FIGS. 2-4, the reverse osmosis unit 12 comprises an elongated, generally cylindrical housing having a cylindrical wall member 24 secured at its opposite ends to a lower base member 26 and an upper cap member 28. These housing components are conveniently adapted for construction from lightweight molded plastic or the like to provide a rugged yet economical structure. Moreover, as depicted in the illustrative embodiment shown in FIGS. 2 and 3, the base member 26 may serve as a common base for additionally supporting an upright cylindrical wall member 30 of a filter unit 31, to be described in more detail.

The feed water supply is coupled to the reverse osmosis unit 12 by a conduit 32 shown coupled to the cap member 28 for communicating a feed water inflow to the interior of the unit housing. This feed water inflow passes through an inflow port 34 bounded by a generally cylindrical valve seat member 36 which in turn defines an annular valve seat 36, presented toward the unit housing interior. Fluid pressure attributable to the feed water supply acts through the inflow port 34 and the valve seat member 36 to urge the underlying control valve 20 and the associated reverse osmosis cartridge 22 downwardly within the unit housing toward a normal operating position with the control valve 20 spaced from the valve seat member 36 (FIG. 2). In this normal operating position, the feed water inflow passes into communication with the reverse osmosis cartridge 22 for purification purposes.

In general terms, the reverse osmosis cartridge 22 comprises a reverse osmosis membrane 38 of a type known to those skilled in the art, to include a porous material defining an extensive surface area and which is wrapped tightly in a large plurality of layers about a central perforated support tube 40, as viewed best in FIGS. 3 and 4. An outer sleeve 42 encases the membrane 38, and the entire cartridge 22 is shaped to fit easily into the unit housing, for example, by fitting the cartridge into the top of the housing when the cap member 28 is removed. In this regard, the cap member 28 is conveniently adapted for thread-on mounting to permit easy cartridge installation and removal, as desired. When the cartridge 22 is installed into the housing, an outer ring seal 44 carried about the sleeve 42 near the upper end of the cartridge functions to confine incoming feed water flow to passage generally longitudinally through the wrapped membrane 38. The inflow control valve 20 is mounted at the upper end of the support tube 40 and functions to close said tube upper end and thereby prevent direct feed water flow into the interior of the support tube.

The lower end of the reverse osmosis cartridge 22 seats into the housing base member 26 in a manner accommodating separated water outflows through a pure outlet port 46 and a reject outlet port 48. More specifically, the lower end of the perforated support tube 40 securely supports the control piston 21 which includes a short cylindrical plug 50 (FIG. 4) seated into the support tube. The control piston 21 further includes a radially enlarged stop flange 54 spaced a short distance below the axially lower end of the membrane 38, as well as a lower guide sleeve 56 received slidably into an upstanding cylinder 60 formed as an integral part of the base member 26. O-ring seals 62 or the like provide a sliding but sealed interface between the cylinder 60 and the inner guide sleeve 56, such that the body of the control piston 21 is exposed to fluid pressure at the pure water outlet port 46. Alternately, appropriate diaphragm structures (not shown) can be used in lieu of the seals 62, in which case the control piston 21 would be mounted within the unit housing to bear against the lower end of a removable cartridge 22. A compression spring 64 reacts between the base member 26 and the underside of the control piston 21 to urge the entire cartridge 22 upwardly within the unit housing. Such upward force applied to the cartridge tends to displace the inflow control valve 20 at the uppermost end of the perforated support tube 40 toward a position seated upon and closing the valve seat 36'. Although the geometry of the inflow control valve 20 may vary, a flat surface valve head is shown in FIGS. 2-4 for engagement with the valve seat 36'.

In normal operation of the water purification system, as described above, the pressure of the incoming feed water supply is sufficient to overcome the upward biasing force of the compression spring 64 to maintain the inflow control valve 20 in an open position relative to the valve seat member 36. The feed water pressure thus causes the cartridge 22 and the control valve 20 to shift downwardly as a unit within the housing, with the flange 54 on the control piston 21 providing a stop engaging the upper end of the cylinder 60 (FIG. 2).

During this open condition, by imposing a sufficient backpressure at the reject outlet port 48, the reverse osmosis membrane functions to separate the incoming feed water supply into a relatively pure water supply and a relatively impure reject water supply. That is, a suitable orifice or restriction 66 is placed at the reject outlet port 48, or along a drain conduit 68 connected thereto, to apply a controlled backpressure to the membrane 38 within the housing. With this backpressure, a portion of the feed water supply is forced to migrate through the porous membrane and further through apertures 70 formed in the perforated support tube 40. This portion of the water flow is substantially purified by passage through the membrane 38 and flows through a port 72 in the control piston 21 to the pure water outlet port 46. Simultaneously, the remaining portion of the feed water supply continues its passage longitudinally through the cartridge 22 to pick up contaminants filtered out by the membrane. This remaining water portion thus comprises a reject or waste water flow having impurities concentrated therein and is discharged through the drain conduit 68 to a drain or the like (not shown).

The produced purified water is coupled through a passage 74 in the base member 26 and a conduit 76 for flow into and storage within the storage vessel 14, as viewed in FIG. 1. The illustrative drawings show the pure water coupled into a vessel chamber 78 lined on one side by a resilient bladder or diaphragm 80. An air chamber 82 is also formed within the vessel 14 on the opposite side of the bladder 80. Air under pressure is supplied into the air chamber through a suitable valve 84, whereby such pressurized air provides the driving force to expel the stored purified water when the faucet valve 18 is opened. More particularly, sufficient air pressure within the chamber 82 causes the pure water supply to flow through the conduit 76 and further through the filter unit 31 and a discharge conduit 86 to the faucet valve 18, whenever the faucet valve is opened. In this regard, the filter unit 31 may include a supply of charcoal 88 (FIG. 3) and/or a fibrous filter 90, or take any other convenient construction known to those skilled in the art.

When the faucet valve 18 is closed, however, pure water production is continued by the reverse osmosis unit 12 for gradually filling the storage vessel chamber 78 with a maximum stored pure supply. During this vessel filling process, the air chamber 82 is compressed resulting in a gradual increase in pressure applied to the stored pure water. When this applied pressure reaches a selected limit, corresponding generally with substantially filling the vessel 14 with pure water, the applied pressure acts through the pure water outlet port 46 in combination with the compression spring 64 to overcome the feed water pressure and close the inflow valve seat 36'. Specifically, the vessel pressure and the spring act against the control piston 21 of the cartridge 22 to shift the cartridge upwardly within the unit housing. This displaces the inflow control valve 20 into seated engagement with the valve seat 36' (FIG. 3) thereby halting or throttling feed water inflow. Accordingly, production of pure water and flow of reject water through the outlet port 46 and 48 are substantially halted. With this arrangement, water waste in the form of substantial flow through the drain conduit 68 is prevented.

The inflow control valve 20 remains closed until the pressure within the pure water storage vessel 14 is reduced by dispensing some of the stored pure water through the faucet valve 18. When the pressure is reduced in this manner, the feed water pressure again overrides the spring 64 and the storage vessel pressure to return the cartridge 22 to the normal, open position permitting feed water inflow. Importantly, during the closed condition, a one-way check valve 92 (FIG. 4) mounted at the upstream end of the control piston port 72 effectively isolates the pressure within the storage vessel 14 from the membrane 3 by preventing fluid backflow through the piston port 72, thereby preventing backpressures or other undesired pressure differentials across the membrane during nonoperating conditions.

The improved reverse osmosis unit of the present invention thus provides a relatively simple construction for an integrated reverse osmosis membrane and related control valve components. The cartridge includes the various valving and sealing components required for normal unit operation. Since the cartridge is normally replaced at periodic intervals to provide a fresh membrane, such as at intervals of about one to three years, the valve members and/or the related control piston components are conveniently replaced at the same time to safeguard against untimely or unexpected valve failures. Such replacement of the valve components does not require special tools or understanding of valve operation. Conveniently, the surface areas of the inflow control valve 20 and the control piston 21 may be designed to provide desired response characteristics to close the inflow port 34 at a selected storage vessel pressure, with the downwardly exposed surface area of the control piston 21 normally being larger that the upwardly exposed area of the inflow control valve 20.

Figure 5:
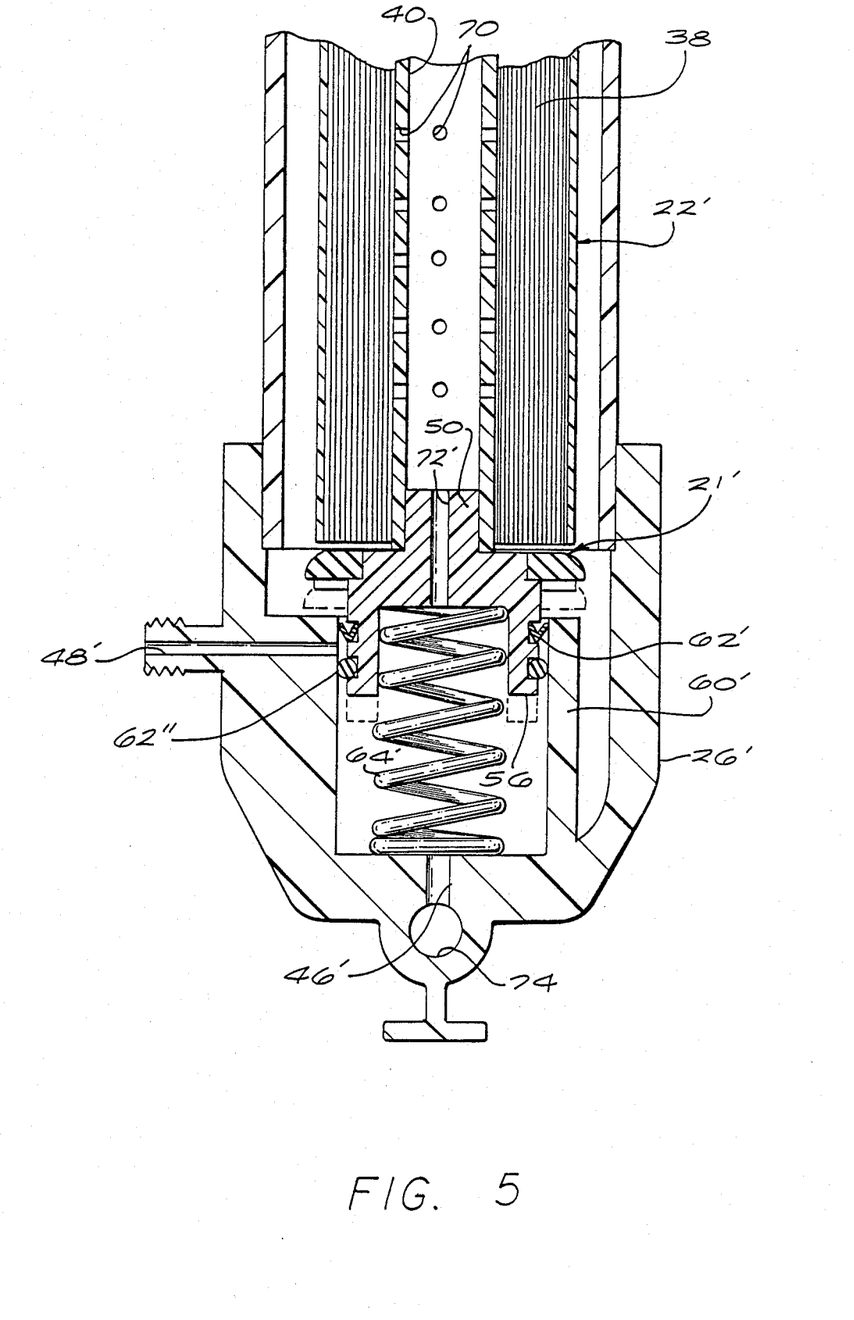
FIG. 5 is an enlarged fragmented vertical sectional view similar to FIG. 4, but illustrating an alternative preferred form of the invention.

FIG. 5 illustrates a modified embodiment of the invention for positively closing a reject outlet port 48' each time a control valve (not shown in FIG. 5) is closed to halt or throttle feed water inflow. In this version, a control piston 21' is again provided as an integral component at the lower end of a perforated support tube 40 having a reverse osmosis membrane 38 wrapped thereon. A lower guide sleeve 56' on the control piston 21' is slidably received into an upstanding cylinder 60' of a modified base member 26', such that a lower face of the control piston is exposed to pure water pressure via a pure water outlet port 46'. A piston port 72' in the control piston permits produced pure water to flow to the pure water outlet port 46', whereas the reject water outlet port 48' has an upstream end opening into the cylinder 60'.

During normal pure water production with the storage vessel below a substantially filled condition, a pair of piston seals such as an upper cup seal 62' and a lower O-ring seal 62', or the like on the guide sleeve 56' are disposed below the reject water outlet port 48'. In this position, as depicted in dotted lines in FIG. 5, the inflow control valve is open to permit feed water inflow, with corresponding outflows through the pure and reject water outlet ports 46' and 48'. However, when the storage vessel reaches a substantially filled condition, the pure water storage vessel pressure combines with a spring 64' to urge the cartridge upwardly toward a position closing the inflow port, as previously described. Concurrently with or immediately prior to closure of the inflow port, the upper seal 62' on the guide sleeve 56' passes and thereby closes the reject water outlet port 48'. Accordingly, the inflow control valve halts further feed water inflow to the reverse osmosis unit 22', while the control piston 21' halts reject water discharge. Such prevention of reject water discharge during the nonproduction phase prevents the occurrence of undesirable pressure differentials across the reverse osmosis membrane 38.

Figure 6:
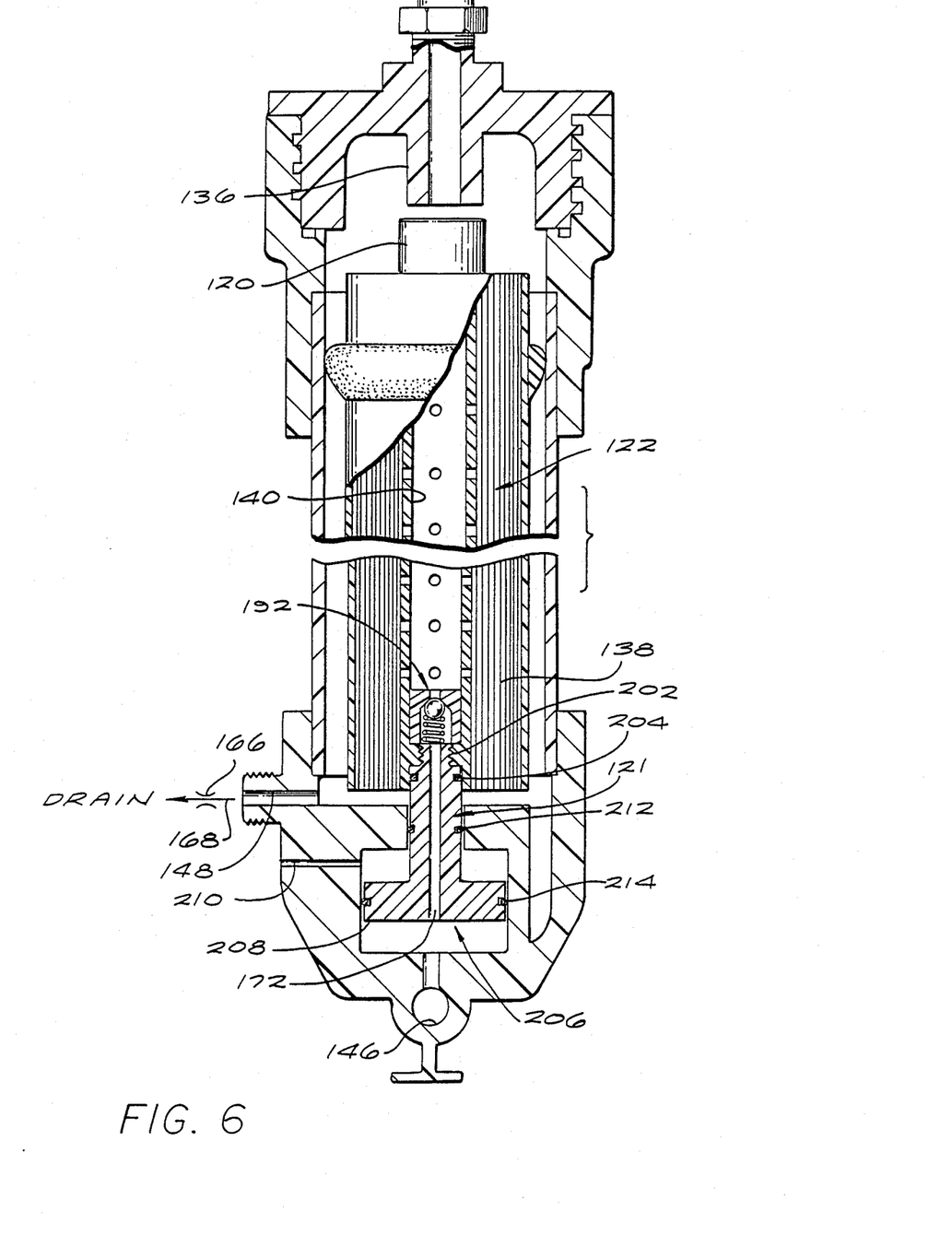
FIG. 6 is an enlarged fragmented vertical sectional view depicting another alternative preferred form of the invention.

FIG. 6 illustrates another alternative form of the invention wherein the control piston at the lower end of a modified reverse osmosis cartridge 122 is designed for operation without use of a biasing spring as described with respect to FIGS. 1–5. For ease of description, the embodiment of FIG. 6 includes a variety of components corresponding generally with the embodiments of FIGS. 1–5, and referenced herein by reference numerals increased by one hundred.

More specifically, the modified reverse osmosis cartridge 122 includes a perforated central support tube 140 having the reverse osmosis membrane 138 wrapped thereon. An inflow control valve 120 closes the upper end of the support tube 140 and is positioned to open or close a valve seat 136 adapted when open for inflow passage of feed water into a cartridge housing. A control piston 121 is mounted at the lower end of the support tube 140 and includes a central port 172 for passage of produced purified water through a pure water outlet port 146 to the storage vessel 14 (FIG. 1). A reject water outlet port 148 is coupled through a drain line 168 which includes a suitable restriction 166 to maintain system backpressure during normal pure water production.

The control piston 121 provides the cartridge with differential surface areas exposed to the pressure of produced pure water at the pure water outlet 146 and to the pressure of feed or reject water within the cartridge housing. The differential surface areas are chosen such that the control piston functions to shift the cartridge to close the inflow control valve 120 against the valve seat 136 when the pure water storage vessel reaches a substantially filled condition. This condition is manifested by a proportional relationship between the pure water pressure and the reject or feed water pressure typically to close the inflow control valve when the pure water pressure reaches about two thirds of the reject or feed water pressure.

With reference to a preferred construction shown in FIG. 6, an upper end of the control piston 121 includes a threaded nipple 202 for convenient thread-in connection to the lower end of the support tube 140. A seal ring 204 or the like prevents water leakage in either direction past the threaded nipple 202. The control piston extends downwardly within the cartridge housing into a lower chamber 206 of relatively wide cross sectional size. A piston member 208 forms an integral part of the control piston 121 and is disposed within the chamber 206 with a lower face thereof exposed to pure water pressure. The opposite side of the piston member 208 is subjected to a reduced pressure such as atmospheric pressure via a vent 210. Appropriate seal rings 212 and 214 or other suitable seal devices isolate the vent 210 from pressurized portions of the system.

The piston member 208 provides sufficient cross sectional area subjected to pure water pressure such that resultant upward forces applied to the cartridge 122 override downward forces applied, for example, to the inflow control valve 120, to close the inflow control valve when the pure water pressure reaches the predetermined upper limit. When this occurs, the entire cartridge shifts upwardly within the housing to move the inflow control valve 120 toward a closed position, thereby halting or throttling feed water inflow until a portion of the produced pure water is dispensed. A check valve 192 such as a spring loaded ball valve is desirably provided at the upstream end of the control piston port 172 to isolate the produced pure water from the membrane 138 when the inflow control valve is closed.

A variety of further modifications and improvements to the invention described herein will be apparent to those skilled in the art. Accordingly, no limitation on the invention is intended by way of the foregoing description or the accompanying drawings, except as set forth in the appended claims.

What is claimed is:

1. A reverse osmosis unit for use in a water purification system to produce a supply of relatively pure water from a feed water supply, said reverse osmosis unit comprising:
   a housing having a hollow interior and defining a feed water inflow port, a pure water outlet port, and a reject water outlet port, said ports communicating with the interior of said housing;
   a reverse osmosis cartridge receivable into the interior of said housing, said cartridge including an inflow control valve and a reverse osmosis membrane and being movable as a unit between a first position with said inflow control valve substantially closing said feed water inflow port and a second position with said inflow control valve in spaced relation with said feed water inflow port.

2. The reverse osmosis unit of claim 1 further including means for displacing said cartridge toward said first position.

3. The reverse osmosis unit of claim 2 wherein said displacing means comprises a control piston coupled to said cartridge.

4. The reverse osmosis unit of claim 3 wherein said control piston is carried directly by said cartridge.

5. The reverse osmosis unit of claim 3 wherein said displacing means further includes a spring.

6. The reverse osmosis unit of claim 1 wherein said housing has an elongated shape, said feed water inflow port being formed at one end of said housing, and said pure water outlet port and said reject water outlet port being formed generally at the opposite end of said housing.

7. The reverse osmosis unit of claim 1 wherein said cartridge comprises an elongated support tube having said membrane wrapped thereabout, said inflow control valve being positioned at and substantially closing one end of said support tube, said support tube having a plurality of perforations formed therein.

8. The reverse osmosis unit of claim 7 wherein said pure water outlet port is positioned for communication with the interior of said support tube, and wherein said reject water outlet port is positioned for communication with the exterior of said support tube, and further including a control piston movable with said cartridge.

9. The reverse osmosis unit of claim 8 wherein said unit further includes seal means for substantially restricting water flow between said feed water inflow port and said reject water outlet port to passage through said cartridge, when said cartridge is received into said housing.

10. The reverse osmosis unit of claim 1 wherein inflow control valve comprises a valve head at one end of said cartridge, and further including a control piston at the opposite end of said cartridge.

11. The reverse osmosis unit of claim 1 further including means for applying a biasing force reacting between said housing and said cartridge to urge said cartridge toward said first position.

12. The reverse osmosis unit of claim 1 further including a control piston carried by said cartridge, said control piston being responsive to the pressure of water at said pure water outlet port for urging said cartridge toward said first position.

13. The reverse osmosis unit of claim 1 further including check valve means for preventing water inflow into said housing through said pure water outlet port.

14. A reverse osmosis unit for use in a water purification system, comprising:
   a housing having a hollow interior and defining a feed water inflow port, a pure water outlet port, and a reject water outlet port, said ports communicating with the interior of said housing;
   reverse osmosis means receivable into the housing interior and including a reverse osmosis membrane and an inflow control valve, said inflow control valve being movable between a first position with said inflow control valve substantially closing said feed water inflow port and a second position with said inflow control valve in spaced relation with said feed water inflow port, said reverse osmosis means further including means responsive to the pressure of water at said pure water outlet port for applying a biasing force to said inflow control valve to urge said inflow control valve toward said first position.

15. The reverse osmosis unit of claim 14 wherein said force applying means comprises a control piston responsive to the pressure of water at said pure water outlet port.

16. The reverse osmosis unit of claim 15 wherein said membrane and said inflow control valve and said control piston comprise a reverse osmosis cartridge movable as a unit between said first and second positions.

17. A reverse osmosis unit for use in a water purification system, comprising:
   a housing having a elongated shape and defining a hollow interior, said housing further defining a feed water inflow port at one end thereof, and a pure water outlet port and a reject water outlet port generally at an opposite end thereof;
   a reverse osmosis cartridge removably receivable into said housing, said cartridge including a reverse osmosis membrane for separating a feed water flow into a relatively pure water supply and a reject water supply, means for coupling said pure water supply to said pure water outlet, means for coupling said reject water supply to said reject water outlet, and an inflow control valve for closing said feed water inflow port, said cartridge being movable as a unit to displace said inflow control valve between a first position with said inflow control valve substantially closing said feed water inflow port, and a second position with said inflow control valve in space relation with said feed water inflow port; and
   pressure responsive means movable with said cartridge and subjected to the pressure of water at said pure water outlet port for urging said cartridge to displace said inflow control valve toward said first position, said pressure responsive means including a control piston.

18. The reverse osmosis unit of claim 17 further including a spring reacting between said cartridge and said housing for urging said cartridge toward said first position.

19. The reverse osmosis unit of claim 17 wherein said cartridge comprises an elongated support tube having said membrane wrapped thereabout, said inflow control valve being positioned at and substantially closing one end of said support tube, said support tube having a plurality of perforations formed therein, and said control piston being positioned at the opposite end of said support tube.

20. The reverse osmosis unit of claim 19 wherein said pure water outlet port is positioned for communication with the interior of said support tube, and wherein said reject water outlet port is positioned for communication with the exterior of said support tube.

21. The reverse osmosis unit of claim 20 wherein said unit further includes seal means for substantially restricting water flow between said feed water inflow port and said reject water outlet port to passage through said cartridge, when said cartridge is received into said housing.

22. The reverse osmosis unit of claim 21 further including check valve means for preventing water inflow into said housing through said pure water outlet port.

23. The reverse osmosis unit of claim 19 further including sliding seal means interacting between said support tube and said housing for communicating the interior of said support tube to said pure water outlet port and for communicating the exterior of said support tube to said reject water outlet port.

24. A reverse osmosis cartridge comprising:
an elongated support tube having a plurality of perforations formed therein;
a feed water inflow control valve positioned generally at one end of said support tube, said valve substantially closing said one end of said support tube;
a reverse osmosis membrane carried about said support tube; and
a control piston secured to said support tube generally at an opposite end thereof, said control piston defining a flow port communicating with the interior of said support tube and being positioned relative to said membrane to permit water flow through said membrane.

25. The reverse osmosis cartridge of claim 24 further including a sleeve wrapped about said membrane.

26. The reverse osmosis cartridge of claim 25 further including a seal ring carried about said sleeve.

27. The reverse osmosis cartridge of claim 24 further including a one-way check valve generally at said opposite end of said support tube to prevent water inflow into said support tube at said opposite end.

28. A water purification system, comprising:
a reverse osmosis unit including a housing and a reverse osmosis cartridge removably receivable into said housing;
said housing defining a feed water inflow port, a pure water outlet port, and a reject water outlet port;
means for coupling a feed water supply to said feed water inflow port;
said reverse osmosis cartridge including a reverse osmosis membrane, and means for restricting an incoming flow of feed water to passage substantially through said membrane, said membrane being adapted to separate said incoming flow of feed water into a relative pure water supply and a reject water supply and means for coupling said pure and reject water supplies respectively to said pure and reject water outlet ports;
means for imposing a fluid backpressure at said reject water outlet;
a storage vessel including means for receiving and storing the pure water supply, and for subjecting the stored pure water supply to increasing fluid pressure in direct proportion to the quantity of pure water within said storage vessel;
conduit means for coupling the pure water supply for flow into the storage vessel; and
faucet valve means coupled to said conduit means and movable to an open position defining an open dispensing path for pressure-induced flow of the pure water from said storage vessel through said faucet valve means;
said reverse osmosis cartridge further including an inflow control valve and a control piston, said cartridge being movable as a unit between a first position with said inflow control valve substantially closing said feed water inflow port, and a second position with said inflow control valve spaced from said feed water inflow port to permit feed water inflow into said housing;
said control piston being carried with said cartridge and movably responsive to the pressure applied to the pure water within said storage vessel to move said cartridge to said first position when said storage vessel reaches a substantially filled condition.

29. The system of claim 28 further including spring means for biasing said cartridge with a selected spring force toward said first position.

30. The system of claim 29 wherein said storage vessel includes a first chamber for receiving the pure water, a second chamber for receiving a supply of a selected gas under pressure, and a resilient wall separating said first and second chambers.

31. The system of claim 28 wherein said housing has an elongated shape, said feed water inflow port being formed at one end of said housing, and said pure water outlet port and said reject water outlet ports being formed generally at the opposite end of said housing.

32. The system of claim 28 wherein said cartridge comprises an elongated support tube having said membrane wrapped thereabout, said inflow control valve being positioned at and substantially closing one end of said support tube, said support tube having a plurality of perforations formed therein, said control piston being positioned at the opposite end of said support tube.

33. The system of claim 32 wherein said pure water outlet port is positioned for communication with the interior of said support tube through a port formed in said control piston, and wherein said reject water outlet port is positioned for communication with the exterior of said support tube.

34. The system of claim 33 wherein said unit further includes seal means for substantially restricting water flow between said feed water inflow port and said reject water outlet port to passage through said membrane, when said cartridge is received into said housing.

35. The system of claim 28 further including check valve means for preventing water inflow into said housing through said pure water outlet port.

36. The system of claim 28 wherein said control piston includes means for closing said reject water outlet port when said cartridge is in said first position.

* * * * *